United States Patent [19]

Di Noia

[11] 4,057,912
[45] Nov. 15, 1977

[54] INSTRUMENT FOR FACILITATING THE CALCULATION OF EQUIVALENT VALUES

[75] Inventor: Francesco Di Noia, Verona, Italy

[73] Assignee: Idea Didattica Editrice, Italy

[21] Appl. No.: 688,729

[22] Filed: May 21, 1976

[30] Foreign Application Priority Data

Oct. 28, 1975 Italy ................................. 84949/75

[51] Int. Cl.² .................. G09B 19/02; G06G 1/06; G09B 1/28
[52] U.S. Cl. ................................. 35/31 E; 235/70 C
[58] Field of Search ................. 35/31 R, 31 E, 30, 75; 235/70 R, 70 A, 70 C

[56] References Cited

U.S. PATENT DOCUMENTS

| 3,790,074 | 2/1974 | Zemanek et al. | 35/31 E X |
| 3,837,569 | 9/1974 | Bradbury et al. | 35/31 E X |

FOREIGN PATENT DOCUMENTS

| 1,393,461 | 2/1965 | France | 35/31 R |
| 14,497 of | 1890 | United Kingdom | 35/31 R |

Primary Examiner—William H. Grieb
Attorney, Agent, or Firm—Steinberg & Blake

[57] ABSTRACT

An instrument for facilitating the calculation of equivalent values includes a plate bearing symbols representing units and dimensions, the plate having a window in which a movable pointer is located. The pointer is movable from a first position representing a first set of units and dimensions to a second position representing an equivalent set of units and dimensions.

8 Claims, 5 Drawing Figures

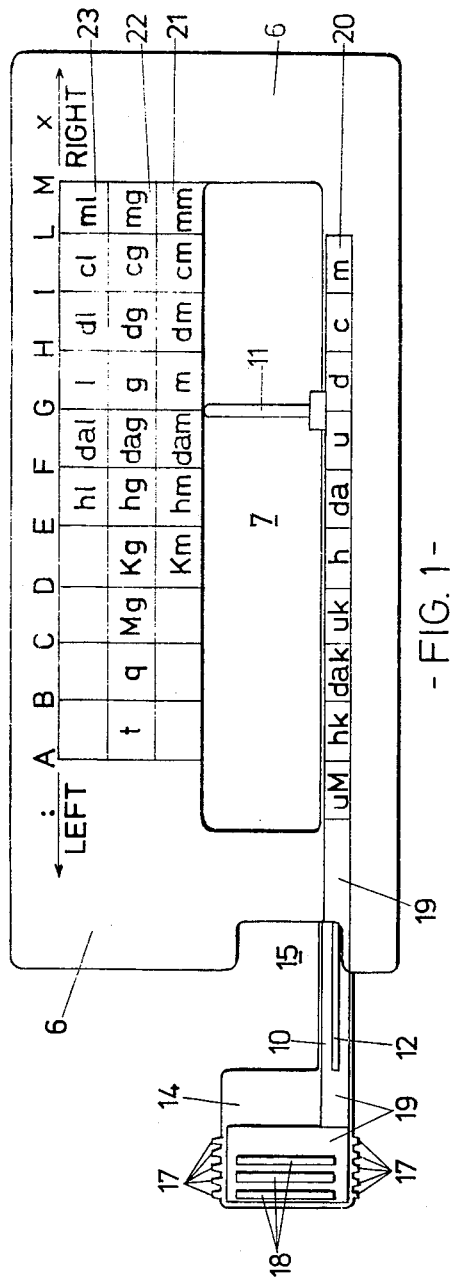
- FIG. 1 -
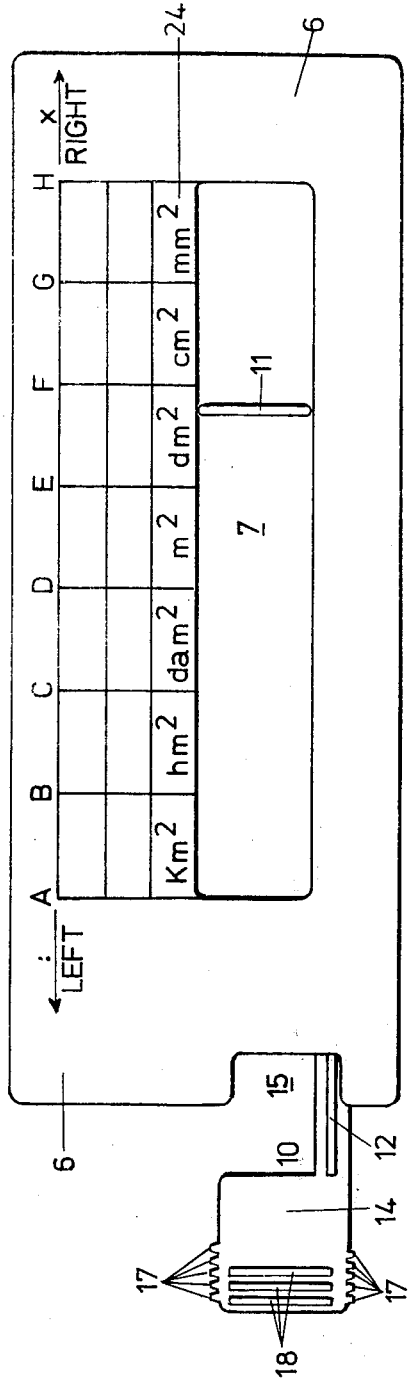
- FIG. 3 -

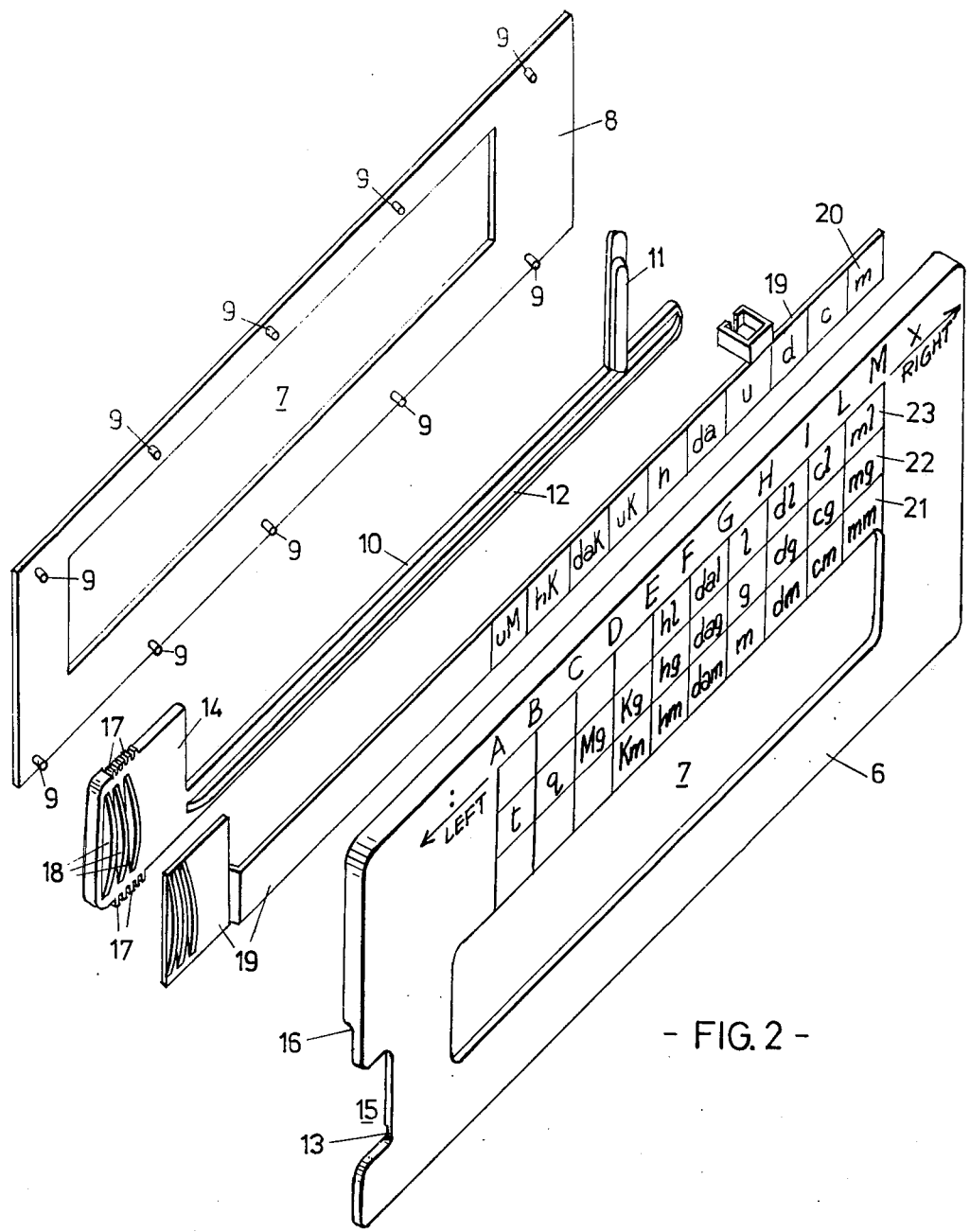
- FIG. 2 -

U.S. Patent  Nov. 15, 1977  Sheet 3 of 3  4,057,912
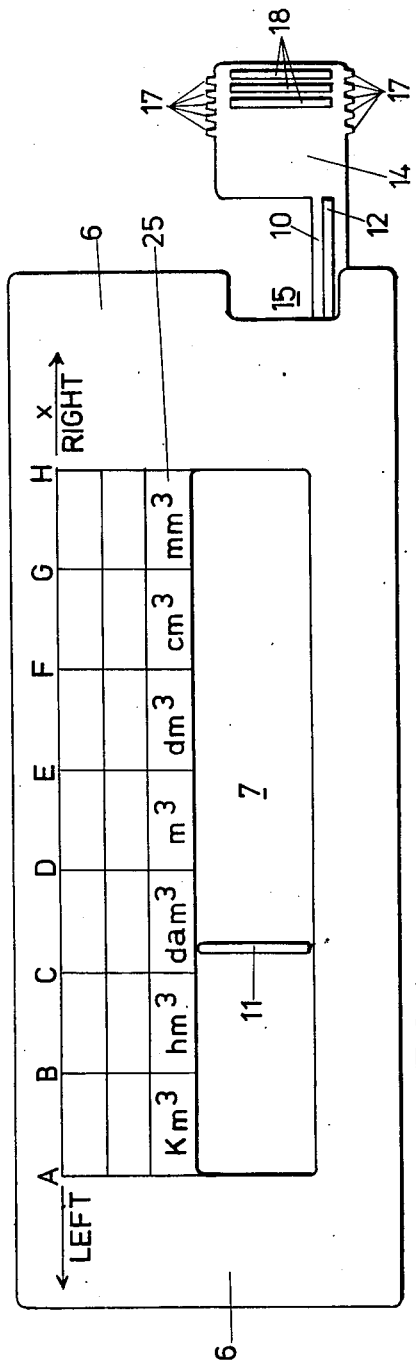
-FIG.4-
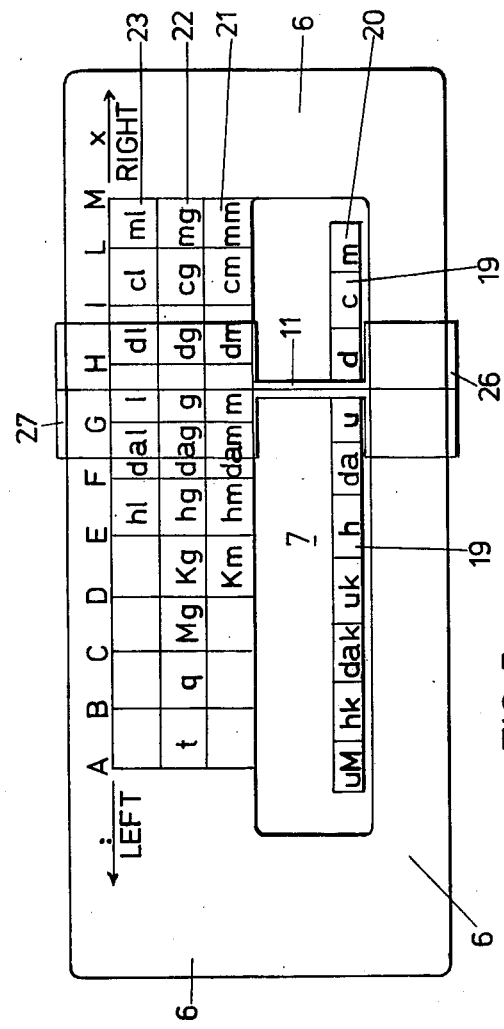
-FIG.5-

INSTRUMENT FOR FACILITATING THE CALCULATION OF EQUIVALENT VALUES

BACKGROUND OF THE INVENTION

The present invention concerns an educational aid which facilitates the calculation of equivalent values.

The object of the invention is to make it easily possible to indicate exactly in writing a measurement of the decimal metric system for indicating the dimensions of digits and for the rapid transformation of one measurement into an equivalent one.

As will be clearly explained hereinafter, this educational aid facilitates the learning of the decimal metric system, since it visualises the dimensions of digits.

The educational aid, hereinafter called a "rule", enables a child, by means of its use, to record the value of the symbols and the serial arrangements thereof within the field of comparison in an almost play-like form.

The present invention will be described with reference to the decimal metric system having a base of ten, but it may also be applied to other metric systems having a base different from 10.

Other objects of the present invention will become apparent in the course of the following description, to be taken into consideration, together with the attached sheet of drawings, in which some preferred embodiments of the invention are shown.

BRIEF DESCRIPTION OF THE DRAWINGS

FIG. 1 shows a plan view of the rule, with a slide having a pointer in a partly extracted position;

FIG. 2 is an exploded view showing the various parts of which the rule is composed;

FIGS. 3 and 4 show the front and back of a rule for the measurement of surfaces and volumes; and FIG. 5 shows a plan view similar to that of FIG. 1 of the rule in which the pointer is linked to the displacement of a slide.

Like referenced numerals and letters used in the Figures refer to identical or equivalent parts.

DETAILED DESCRIPTION

Referring to FIGS. 1 and 2, it can be seen that a rule is composed of a substantially rectangular front plate 6, suitably of plastics material, in which a rectangular window 7 is formed, and a back plate 8, also provided with a window 7, securable to plate 6 by means of press studs 9 engaging in suitable recesses (not shown) provided on the back of the plate 6. When the plate 6 and the back 8 are assembled a slide 10 is supported between them, on which slide 10 a pointer 11 is provided. The slide 10 has a longitudinal rib 12 which is guided within a suitable guide slot 13 formed in the back surface of the plate 6, and terminates in a substantially rectangular handle portion 14 capable of being received in a suitable recess 16 provided on the back of plate 6 and partly visible in a window 15 of the plate 6. The handle 14 is provided with notches 17 to facilitate gripping of the handle 14 and manipulation of the slide 10 after it has been extracted from the recess 16 by acting on curved ribs 18 provided on the front of the handle 14. The ribs 18 also provide seats for engagement of an end portion of a strip 19 adapted to slide on the outer surface of the plate 6, in a suitable recess (not shown) provided below the window 7. The strip 19 carries symbols representing powers of units indicated at 20 by "$uM$ - $hk$ - $dak$ - $uk$ - $h$ - $da$ - $u$" on the left of the pointer 11 and by "$d$ - $c$ - $m$" on the right of the pointer 11. These symbols are in practice those of units of measurement, and may also be different from those indicated, which in fact represent: $uM$ = unit of millions, $hk$ = hundreds of thousands, $dak$ = tens of thousands, $uk$ = units of thousands, $h$ = hundreds of single units, $da$ = single tens, $u$ = single units, $d$ = tenths, $c$ = hundredths and $m$ = thousandths.

From the above, it is clear that the symbols of the power of the units have to be displaced at the same rate as the pointer 11, or they have to be linked to the displacement of the pointer 11, and therefore it is obvious that, instead of being engaged on the ribs 18 the strip 19 can instead be connected to the pointer 11 without altering its essential characteristics of the apparatus.

Above the window 7 a series of symbols of the units of length, weight and capacity are indicated by 21, 22 and 23 and are separated, symbol by symbol, by means of lines, each line being distinguished by a letter of the alphabet from A to M. In addition to this, the upper part of the plate 6 is provided with two arrows under which the words "left" and "right" are written, which indicate that, if the pointer is displaced to the left, a specific measurement is converted into a corresponding one by means of a division, see also the sign of division (:) above the arrow "left", whilst, if the pointer is displaced to the right, a specific measurement is converted into a corresponding one by means of a multiplication, see also the sign of multiplication ($x$) above the arrow "right".

The rule is used in the following manner:

When an operator wishes to write in the window 7, on a piece of paper below it, the measurement 415 units of meters (415 m), the operator must, first of all, displace the pointer 11 so as to align it with the line H, so that the symbol $u$ is disposed below the symbol $m$, and then write the digit 5 between $m$ and $u$, the digit 1 between $dam$ and $da$, the digit 4 between $hm$ and $h$.

When the measurement 415m is to be transformed into an equivalent, for example in $cm$, the operator simply displaces the pointer 11 to align it with the line L and to add zeros below the symbols $dm$ and $cm$. It is obvious that the displacement of the pointer 11 has also caused the displacement of the symbols of the powers, whereby, with the equivalent value computed, the digit 4 will no longer be between $hm$ and $h$, but between $hm$ and $dak$. This fact shows the positional value of the digits unequivocably, since, before the conversion, the digit 4 had the dimension of hundreds of meters, whilst after the conversion, the digit 4 has assumed the dimension of tens of thousands of centimeters.

On the other hand, if the pointer 11 had been displaced from the initial position, in alignment with the line H, to the left to become aligned with the line F, another conversion would have been performed, i.e. from $m$ into $hm$, always with the result of showing the new dimension of the digit 4 which, becoming disposed between $hm$ and $u$, assumes the value of 4 units of hectometers whilst the digit 1 becomes tenths of a hectometer and the digit 5 becomes hundredths of a hectometer.

Obviously, therefore, the pointer 11 always signals the end of a whole number and the end of the whole part of a number which has a decimal part, and in such a case the pointer indicates the place where normally the decimal point should be.

With reference to FIGS. 3 and 4, it may be noted that both sides of the rule may be used. FIG. 3 in fact shows the units surface area 24 in their proper order, whilst FIG. 4, the back of the rule, shows the units of volume 25 in their proper order. These Figures do not show the symbols for units of quantity for indicating the power of the digits, but it is obvious that this fact in no way alters the substance of the invention, since such arrangement must obviously reproduce the visual representation of the dimensions of the digits, as described for FIGS. 1 and 2.

The rule shown in FIG. 5 is similar to that of FIG. 1, and it is evident that the pointer 11 is connected to two parts 26 and 27 of a sliding cursor adapted to move in suitable grooves or on ribs provided along the upper and lower sides of the rule. This cursor made, for example, of transparent plastics material, and may obviously be provided with extensions for carrying the symbols for indicating, as in the case of the rule in FIGS. 1 and 2, the dimensions of the digits.

In FIG. 5, the extensions of the cursor for carrying the symbols of the dimension, instead of being outside the window 7, as in FIG. 1, are inside the window and it is clear that they may be located above or below the space for writing the numbers.

It is thus apparent from the above description and drawings that the calculating instrument of the invention is capable of converting a numerical value of a given quantity in one unit to a numerical value of the same quantity in a different unit. The plate means 6 thus carries a series of scales such as the scales 21–23, in each of which different units of a given quantity are arranged in the form of graduations of the scale which are situated at a given distance from each other. Thus the scale 21 has its graduations arranged according to different units of distance or length, while the scale 22 has its graduations arranged according to different units of weight, and so on. The plate means 6 has operatively connected thereto, for movement in a direction parallel to any one of the scales 21–23, the scale 19 which has thereon the series of graduations 20 indicative of different characteristics of a numeral, these characteristics in the illustrated example being the arrangement of the digits of the numeral according to the tens or decimal system. The pointer 11 is operatively connected with the movable scale means 19 for movement therewith and is situated at a part of the scale of graduations 20 according to which the part of the numeral which is on one side of the pointer 11 will have a given relationship with respect to the part of the numeral which is on the other side of the pointer 11, this relationship in the illustrated example being such that on the left of the pointer 11 the part of a given numeral extending up to its decimal point is arranged while on the right of the pointer 11 the part of the numeral subsequent to the decimal point is arranged. Of course the graduations of the scale 20 are situated with respect to each other at the same distance as the graduations of any one of the scales 21–23.

The plate means 6 includes a means for situating initially a given numeral with respect to one of the scales 21–23 so as to be indicative of the quantity represented by the selected one of these scales in a given unit. This means for situating such numeral with respect to a selected one of the scales 21–23 is of course formed by the window 7 behind which a sheet of paper may be situated so as to have the initial numeral written thereon. After the pointer 11 is aligned with the numeral thus written initially on the paper behind the window 7, it is of course possible to shift the pointer 11 and the scale 19 therewith, in the manner described above, so as to be able to convert the numeral representing a given quantity in a given unit into a numeral representing the same quantity in a different unit.

Within a practical embodiment of the present invention, any formal variations may be made which do not alter the substance of the present invention and may therefore be considered as falling within the scope of the invention.

It is likewise evident that the material for producing the rule may be of any type, such as plastics material, cardboard, synthetic fibres, wood, metal and the like, or any combination of these materials, without thereby departing from the range of possible embodiments of the invention.

I claim:

1. A calculating instrument for converting a numeral representing a given quantity in one unit into a numeral representing the same quantity in a different unit, comprising plate means carrying at least one scale of graduations representing different units of a given quantity, with said graduations being situated at a given distance one from the next along said scale, so that the latter scale is stationary with respect to said plate means, movable scale means operatively connected with said plate means for movement with respect thereto in a direction parallel to said stationary scale, said movable scale means carrying a series of graduations situated one from the next at the same distance as said graduations of said stationary scale and said graduations of said movable scale means being indicative of different characteristics of a numeral, pointer means operatively connected with said movable scale means for movement therewith and extending between said movable scale means and said stationary scale, said pointer means being situated along the graduations of said movable scale means at a location where a part of a numeral situated on one side of said pointer means has a given relationship with respect to a part of the numeral situated on the other side of said pointer means, said plate means including a means for initially situating a given numeral indicating the magnitude of a quantity whose units are represented by said stationary scale at a position with respect to said stationary scale where said numeral will indicate said quantity in a given unit of said stationary scale, said pointer means being movable together with said movable scale means with respect to the numeral thus situated initially at a given position with respect to said stationary scale to a location where said numeral can be converted into another numeral indicating the same quantity in a different unit of said stationary scale.

2. The combination of claim 1 and wherein said graduations of said movable scale means indicate the decimal characteristics of a numeral with said pointer means being situated at the decimal point, said graduations of said stationary scale being in the form of units of a quantity which differ one from the next by a multiple of 10.

3. The combination of claim 2 and wherein said plate means carries a plurality of said stationary scales, and the latter stationary scales respectively representing quantities such as distance, weight, and volume according to the metric system.

4. The combination of claim 1 and wherein the means for situating a given numeral at a given location with respect to said stationary scale is formed by a portion of said plate means which is formed with an aperture passing completely through said plate means so that the latter can be situated on a sheet of paper on which the numeral is written so as to be positioned with respect to said stationary scale while being visible through said aperture.

5. The combination of claim 1 and wherein a manually-engageable means is operatively connected with said movable scale means for facilitating movement thereof.

6. The combination of claim 5 and wherein said pointer means includes an elongated bar extending longitudinally along said movable scale means and terminating in a handle which forms part of said manually engageable means, said bar having a rib while said plate means includes a groove receiving said rib for guiding said bar for movement.

7. The combination of claim 1 and wherein said pointer means is in the form of a cursor slidable with respect to said plate means.

8. The combination of claim 1 and wherein said plate means includes a pair of plates connected together while defining between themselves a space in which said pointer means and movable scale means are accommodated for movement.

* * * * *